United States Patent [19]

Egitto et al.

[11] Patent Number: 5,958,996
[45] Date of Patent: Sep. 28, 1999

[54] METHOD FOR PRODUCING A DIFFUSION BARRIER AND POLYMERIC ARTICLE HAVING A DIFFUSION BARRIER

[75] Inventors: Frank Daniel Egitto, Binghamton; Luis Jesus Matienzo, Endicott; Bruce Otho Morrison, Jr., Vestal, all of N.Y.

[73] Assignee: International Business Machines Corporation, Armonk, N.Y.

[21] Appl. No.: 08/808,142

[22] Filed: Feb. 28, 1997

Related U.S. Application Data

[62] Division of application No. 08/671,427, Jun. 27, 1996, Pat. No. 5,693,928.

[51] Int. Cl.$^6$ ............................................. C08J 3/28
[52] U.S. Cl. ............................... 522/111; 522/148
[58] Field of Search ................... 522/148, 111; 525/477; 252/62.3 R, 62.3 Q

[56] References Cited

U.S. PATENT DOCUMENTS

| | | |
|---|---|---|
| 3,890,149 | 6/1975 | Schlesinger et al. .................. 430/162 |
| 4,283,513 | 8/1981 | Mikami ................................... 525/477 |
| 4,344,981 | 8/1982 | Imada et al. ............................ 427/40 |
| 4,481,289 | 11/1984 | Honma .................................. 430/532 |
| 4,701,342 | 10/1987 | Novembre et al. ..................... 427/38 |
| 5,028,560 | 7/1991 | Tsukamoto et al. .................... 437/81 |
| 5,510,158 | 4/1996 | Hiramoto et al. ..................... 427/582 |
| 5,714,265 | 2/1998 | Meguriya et al. ..................... 428/447 |

*Primary Examiner*—Peter F. Kulkosky
*Attorney, Agent, or Firm*—Scheimser, Olsen & Watts; Ronald A. Kaschak

[57] ABSTRACT

A method of forming a diffusion barrier on an article of a polymer blend of (i) a high surface energy polymer and (ii) a low surface energy polymer. Most commonly the low surface energy polymer is an organosilicon polymer, as a polysilane or a polysiloxane. The surface of the article is exposed to ozone and ultraviolet radiation to form a diffusion barrier.

8 Claims, 2 Drawing Sheets

METHOD FOR PRODUCING A DIFFUSION BARRIER AND POLYMERIC ARTICLE HAVING A DIFFUSION BARRIER

This is a divisional of Ser. No. 08/671,427 filed on Jun. 27, 1996, now U.S. Pat. No. 5,693,928 to Egitto et al.

FIELD OF THE INVENTION

This invention relates to diffusion barriers on polymeric articles, and to methods of preparing the diffusion barriers. According to the invention disclosed herein, a polymer blend alloy is prepared containing a high surface energy component and a low surface energy component. The article is then subjected to an ozone containing atmosphere in the presence of ultra violet radiation to form the diffusion barrier. The diffusion barrier is formed by the partial oxidation of the low surface energy component that has diffused to the surface. Exemplary low surface energy components are polysilanes, e.g., having —Si—Si— repeating units, exemplified by [—Si(CH$_3$)$_2$—] and the like, and polysiloxanes, e.g., having —Si—O— repeating units, exemplified by [—Si(CH$_3$)$_2$O—] and the like.

BACKGROUND OF THE INVENTION

For polymer blends, that is, physical mixtures of two or more polymers or copolymers that are not linked by covalent bonds, and that contain one or more components having lower surface energy than the bulk polymer, polymers, or copolymers, segregation of the low surface energy components to the surface can occur. This results in a hydrophobic surface and inhibits the ability to transfer materials (e.g., inks, paints, dyes) to the surface of an article comprising the blend. This segregation also may result in poor interfacial adhesion between applied layers, films, coatings, adhesives, and the like, and underlying articles comprising the blend.

In other cases, for a homogeneous polymer system, inward diffusion of moisture or other chemicals/materials into the bulk may be a problem. This can result in degradation of the properties of the article.

Thus, there exists a need for surface modification of articles fabricated of polymer blends or alloys to prevent segregation and hydrophobicity, and to enhance the wettability and bondability of the surface.

SUMMARY OF THE INVENTION

For polymer blends, the chemical transformation of the segregated material into a diffusion barrier has been achieved according to our invention. This transformation retards further segregation of the low surface energy component(s) to the surface.

In addition, the modified surface can act as a barrier to inward diffusion of moisture or other undesirable materials.

For a single polymer system, doping of the polymer with a component or components having lower surface energy than the bulk, followed by oxidation with ozone in the presence of ultra violet (uv) radiation will result in a diffusion barrier and a more stable surface with respect to reactions with the environment.

The polymeric body is treated with reactive oxygen (ozone) and UV radiation. The apparatus for this technique is quite modest, usually consisting of a UV source, e.g., a low-pressure mercury vapor lamp, and a chamber to house the UV source and the material being treated. The ozone is the photolysis product of oxygen in the presence of a source, as a mercury vapor light source, emitting 184.9 nanometer radiation. Treatment is almost always performed in air at atmospheric pressure to get ozone.

The method of this invention is particularly useful with organosilicon/organic polymer blends. By organosilicons are meant polysilanes and polysiloxanes, where polysilanes are polymers having —Si—Si— repeating units, exemplified by [—Si(CH$_3$)$_2$—] and the like, and polysiloxanes are polymers having —Si—O— repeating units, exemplified by [—Si(CH$_3$)$_2$O—] and the like. In these systems conversion of organosilicon materials to silicon oxides is a phenomenon that is well documented for exposure to oxygen plasma environments. Oxygen reactive ion etching of silicon-containing polymers results in an initial thickness loss and a gradual slowing of polymer erosion until etching ceases. During etching, it is believed that mobile silicon-containing monomer or polymer diffuses to the polymer surface where it is converted to SiO$_2$ or a suboxide thereof, and functions as an increasingly effective etching barrier.

According to our invention, UV/ozone treatment of organic polymers having organosilicon additives results in formation of a thin, protective barrier that inhibits diffusion of bulk material to the surface, inhibits diffusion of material from the environment into the bulk, and inhibits environmental contamination of the surface.

This is achieved by doping the bulk polymer or a surface portion thereof with a suitable organosilicon polymer or monomer additive at an appropriate concentration. The doped blend is then subjected to exposure in a UV/ozone environment such that a thin, stable, protective barrier is formed at the surface.

The method of this invention, and the resulting products are particularly useful, for example, (1) to enhance printability and adhesion of inks to organosilicon containing polymers, for example, encapsulated products with organosilicon-containing encapsulants (e.g., Dexter Hysol 4450);

(2) to enhance the moisture and chemical resistance of polymers, such as encapsulants, in general, by doping with a suitable additive and treating in UV/ozone;

(3) to enhance the moisture and chemical resistance of other polymers used for a variety of applications requiring diffusion barriers and/or stable surface properties.

A further advantage is that unlike barriers produced by deposition processes, the method of the invention is self-patterning, i.e., the material that constitutes the protective barrier is formed only on the organosilicon-bearing material, not deposited on other areas of the substrate. Also, since the barrier formed by this method is, by the nature of the technique, incorporated as part of the organosilicon-bearing material, not as a separate, deposited layer, adhesion of the barrier to the bulk is high. In addition, the barrier, which is silicon dioxide or a suboxide thereof, is optically transparent (in the visible, and into the 185 nanometer ultraviolet and 1140 nanometer infrared bands) and hydrophilic. The method of the invention is also less expensive than conventional means of producing barrier films.

THE FIGURES

The invention may be understood by reference to the FIGURES appended hereto.

DETAILED DESCRIPTION OF THE INVENTION

Figure 1:
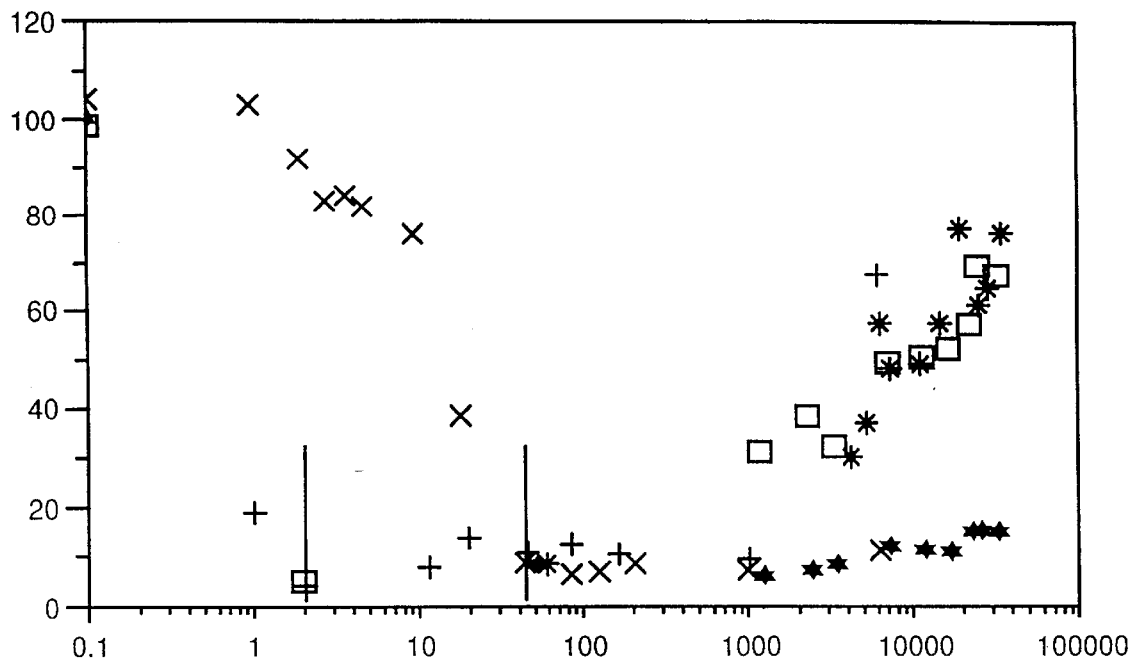
FIG. 1 shows the water contact angle on a film of a organosilicon polymer—polyepoxide polymer blend as a function of surface treatment and storage times.
Figure 1:
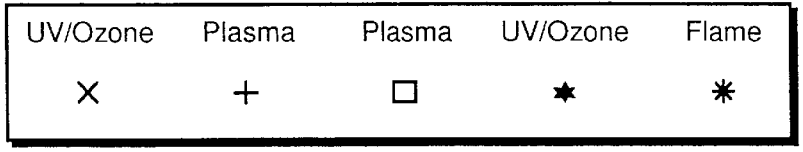

According to the invention described herein, for polymer blends, the chemical transformation of the segregated material into a diffusion barrier has been achieved. The method of this invention utilizes a polymer blend or polymer of a high surface energy material, as an organic polymer, and an excess of a low surface energy material, such as a organosilicon containing polymer, exemplified by a silane, such as an alkyl silane, or a siloxane, having the formula R—Si(OCH$_3$)$_3$, R—Si(OCH$_3$)$_2$CH$_3$, or R—Si(OCH$_3$)(CH$_3$)$_3$, where R is an alkyl or vinyl group. By "high" and "low" surface energy materials are meant miscible materials differeing in critical surface tension, for example by 5 dynes/centimeter and preferable 10 dynes/centimeter or more. The low surface energy material diffuses toward the surface, where it is converted to an oxide, e.g., SiO$_x$, where x is between 1.6 and 2.0. This transformation or oxidation retards further segregation of the low surface energy component(s) to the surface, and provides a modified surface.

In addition, the modified surface can act as a barrier to inward diffusion of moisture or other undesirable materials.

Unlike barriers produced by deposition processes, the method of this invention is self-patterning, i.e., the material that constitutes the protective barrier is formed only on the organosilicon-bearing material, not deposited on other areas of the substrate. Also, since the barrier formed by this method is, by the nature of the technique, incorporated as part of the organosilicon-bearing material, not as a separate, deposited layer, adhesion of the barrier to the bulk is very high. In addition, the barrier is optically transparent (in the visible, and into the 185 nanometer ultraviolet and 1140 nanometer infrared bands) and hydrophilic. This method is also less expensive than conventional means of producing barrier films.

For a single polymer system, doping of the bulk polymer with a component or components having lower surface energy than the bulk, followed by oxidation with ozone in the presence of ultra violet radiation, will result in a diffusion barrier and a more stable surface with respect to reactions with the environment.

The method of this invention utilizes reactive oxygen and UV radiation. The apparatus for this technique is quite modest, usually consisting of a UV source, e.g., a low-pressure mercury vapor lamp, and a chamber to house the UV source and the articles being treated. The ozone comes from the photolysis of oxygen. A low pressure mercury vapor source emits radiation at wavelengths of 184.9 and 253.7 nanometers. Oxygen molecules, O$_2$, absorb 184.9 nanometer radiation and dissociate to form atomic oxygen, O. The atomic oxygen, O, reacts with molecular oxygen, O$_2$, to form ozone, O$_3$. Thus, treatment is almost always performed in air at atmospheric pressure with the mercury vaport light source, although other ozone sources may be utilized. In comparison with plasma systems, UV/ozone surface treatment equipment is relatively inexpensive.

The method of the invention is to be distinguished from oxygen reactive ion etching. Conversion of organo-organosilicon materials, as silanes and siloxanes, to silicon oxides is a phenomenon that is well documented for exposure to oxygen plasma environments, i.e., oxygen reactive ion etching. Oxygen reactive ion etching of silicon-containing polymers results in an initial thickness loss and a gradual slowing of polymer erosion until etching ceases. During etching, it is believed that silicon-containing monomer diffuses to the polymer surface where it is converted to SiO$_2$ and functions as an increasingly effective etching barrier.

The method of this invention and the articles produced thereby can be prepared from various polymer blends. The preferred polymer blends are characterized by miscibility of the constituents, and an excess of the low surface energy component, where the "high" and "low" surface energy constituents differ in surface tension, preferably by 5 to 10 dynes/centimeter or more. Exemplary silanes include those generally commercially available silanes, such as dimethyl silane, and exemplary siloxanes are those having the formula R—Si(OCH$_3$)$_3$, R—Si(OCH$_3$)$_2$CH$_3$, or R—Si(OCH$_3$)(CH$_3$)$_3$, where R is an alkyl or vinyl group, and include methyl, ethyl, propyl, and vinyl siloxanes. Exemplary organic polymers include polyvinyls, polyepoxides, polycarbonates, polyimides, and polyurethanes. Generally, the preferred polysilanes and polysiloxanes have a surface tension below about 25 to 30 dynes per centimeter, and the preferred organic polymers have a surface tension above about 25 to 30 dynes per centimeter. The preferred blends are within the range of miscibility of the constituents and contain anexcess of the low surface energy organosilicon constituent. Especially preferred are polymer blends of poylsiloxanes and polyepoxides.

The invention is illustrated by the following example.

EXAMPLE

Samples of a commercially available epoxy-based encapsulant (Dexter Hysol 4450) containing some organosilicon and other inorganic fillers were exposed to UV/ozone, oxygen plasma, and flame treatments for various durations.

As shown in FIG. 1, advancing DI water contact angle on the Dexter Hysol surfaces were reduced from initial average values greater than 100 degrees to a values less than 10 degrees for UV/ozone and plasma treatments, and to less than 30 degrees for the flame treatment. Contact angles were then monitored as a function of aging time during storage in lab ambient conditions. As the figure shows, the UV/ozone treated surface maintains its high degree of hydrophilic character upon aging, while the plasma and flame-treated surfaces revert back to a more hydrophobic character. High resolution x-ray photoelectron spectroscopy (XPS) in the Si 2p photoemission band suggest that during UV/ozone and plasma treatments of the Dexter Hysol material, O—Si—C bonds in the siloxane, observed prior to treatment, are converted to SiO$_x$, where x is between 1.6 and 2.

Figure 2:
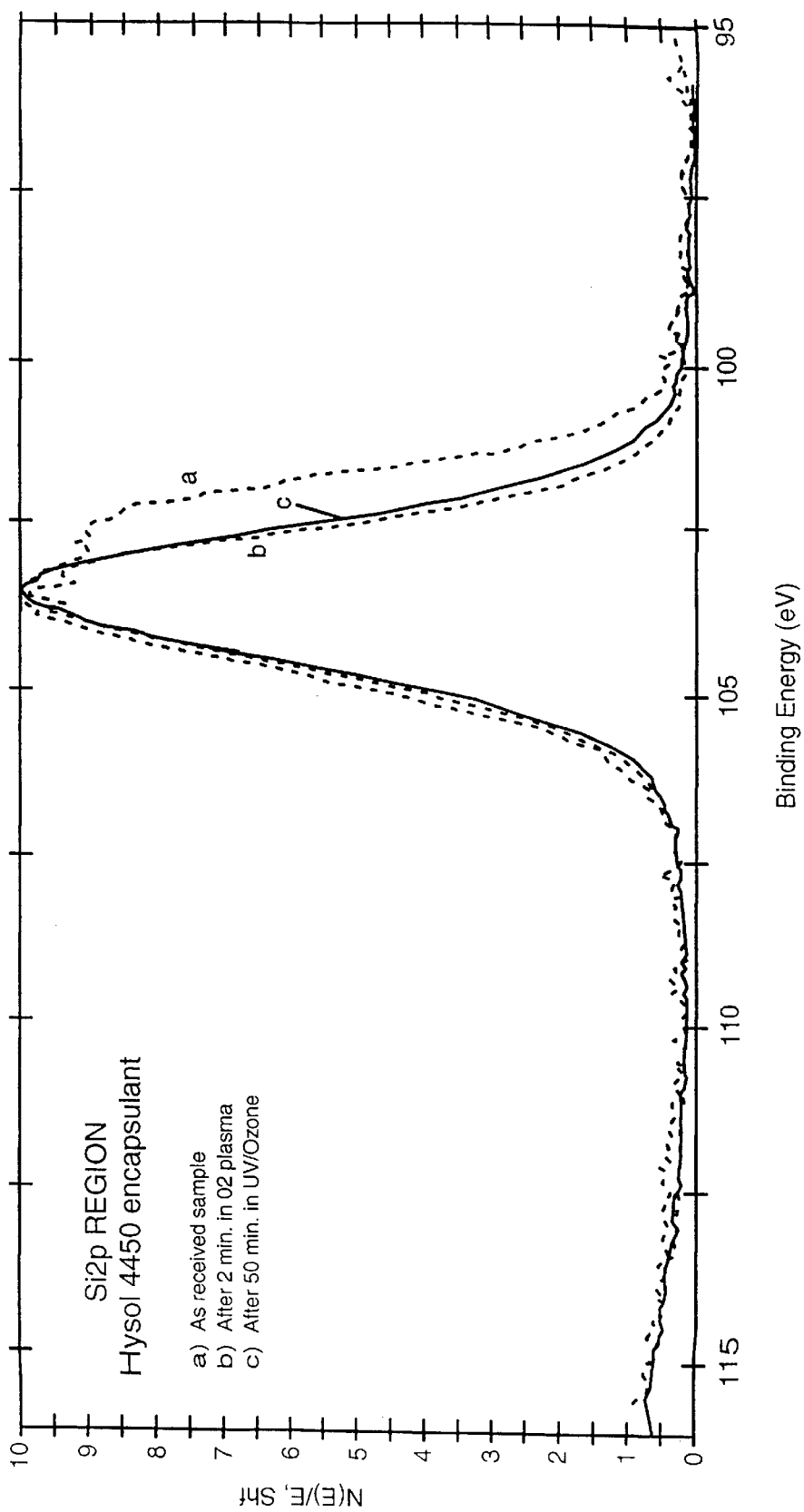
FIG. 2 shows the x-ray photoelectron spectroscopy pattern of a sample of a organosilicon polymer—polyepoxide polymer blend after UV/ozone surface treatment.

This is illustrated in FIG. 2 which shows high resolution XPS spectra in the Si 2p photoemission band for organosilicon samples before treatment (a), after two minutes of O$_2$ plasma treatment (b), and after 50 minutes of UV/ozone exposure (c). The spectrum of the untreated sample (a) contains contributions from both the silicon containing polymer (low binding energy) and glass filler (higher binding energy). After treatment (b and c), the organosilicon is transformed into a glassy surface (higher binding energy). For this reason, it is believed that the signal in (b) and (c) is the result of transformation and not exposure of underlying glass-filler particles.

XPS examination of surfaces aged for greater than 40 days revealed that the UV/ozone-treated and plasma-treated surfaces retained a strong SiO$_x$ contribution, while the flame-treated surfaces at no time exhibited the SiO$_x$ character (i.e., at all times maintained a O—Si—C character).

The increase in contact angle following treatment for plasma-treated and flame-treated parts is due primarily to a combination of two phenomena; (1) some diffusion of organosilicon material from the bulk of the encapsulant to the surface, and (2) changes in surface groups, e.g., decrease in carbon-oxygen groups. Both of these factors influence the surface wetting properties. The apparent lack of reversion in contact angle of the LW/ozone-treated encapsulant surface to its original state is indicative of the formation of a thin, more stable protective barrier against diffusion. In addition, the observation that the UV/ozone-treated surface maintains a highly hydrophilic nature indicates that in addition to resisting diffusion, the UV/ozone-treated surface is resistant to contamination from the environment.

Although the exact mechanisms leading to these differences in the surface properties resulting from each of the treatments are unknown at this time, it is believed that the presence of the intense UV exposure and/or the absence of bombardment by kinetically energetic particles in the UV/ozone system may impart such favorable properties. In addition, since material removal is more pronounced in the plasma system, the formation of the protective barrier may be less effective than that produced using UV/ozone treatment.

UV/ozone treatment of organic polymers having low surface energy organosilicon additives results in formation of a thin, protective barrier that inhibits diffusion of bulk material to the surface, inhibits diffusion of material from the environment into the bulk, and inhibits environmental contamination of the surface.

This is achieved by doping the polymer with a suitable organosilicon additive at an appropriate concentration. The doped blend is then subjected to exposure in a UV/ozone environment such that a thin, stable, protective barrier is formed at the surface.

Several ink formulations were tested for adhesion (Tape Tests) on surfaces of the Dexter Hysol 4450 polysiloxane-polyepoxide polymer blend encapsulant treated using a variety of techniques. Ink was applied to the surface of the surface treated samples, and then the ink was tested for adhesion by consumer adhesive tape. Results are given in the tables below.

TABLE I

Results of Example 1 "As Formed" tape tests.

| INK | PLASMA | UV-OZONE | CONTROL |
|---|---|---|---|
| DEXTER | PASS | PASS | PASS |
| DEXTER W/IPA | NA | PASS | PASS |
| TRA. TECH M2 | PASS | NA | NA |
| TRA. TECH B/GL | PASS | PASS | PASS |
| MARKEM 4481 | PASS | PASS | FAIL |
| AIS | PASS | PASS | FAIL |

NOTE:
FAILS ALWAYS OCCURRED ON BOTH SCOTCH AND KAPTON TAPES AND ON LINES GOING BOTH INLINE AND PERPENDICULAR TO THE TAPE LIFT DIRECTION.

The tests above were repeated after five weeks of aging at ambient conditions of approximately 20 degrees C. and 30–70 percent relative humidity, and the following results were obtained.

TABLE II

Results of Parts in Table I retested after five weeks of aging.

| INK | PLASMA | UV-OZONE | CONTROL |
|---|---|---|---|
| DEXTER | PASS | PASS | PASS |
| DEXTER W/IPA | NA | PASS | PASS |
| TRA. TECH M2 | PASS | NA | NA |
| TRA. TECH B/GL | PASS | PASS | PASS |
| MARKEM 4481 | PASS | PASS | FAIL |
| AIS | PASS | PASS | PASS |

Comparison with the wettability tests shown in FIG. 1 showed that the UV-ozone treated samples were more stable then the plasma and control samples.

TABLE III

Results of tape test matrix.

| INK | PLASMA | UVOZONE | FLAME | OZONE | CONTROL |
|---|---|---|---|---|---|
| DEXTER | PASS | PASS | FAIL | FAIL | PASS |
| T.T B/GL | PASS | PASS | PASS | FAIL | PASS |
| MARKEM 4481 | PASS | PASS | FAIL | FAIL | FAIL |
| AIS | PASS | PASS | PASS | FAIL | FAIL |

The results shown in Tables I and III are consistent. Furthermore, treatment with flame and ozone-only (no UV exposure) do not improve markability. In fact, in some instances, adhesion becomes worse with these treatments. However, the plasma and uv/ozone treatments consistently show positive results independent of ink type. Also, Table II illustrates that no degradation over time occurs for markability on parts treated using plasma or uv/ozone processes. Table III also shows good results independent of ink chemistry.

Although both UV/ozone and plasma treatments result in improved markability over extended periods of time (i.e., long shelf life with respect to markability), the UV/ozone treatment results in a more stable surface as inferred from contact angle measurements with respect to hydrophilic properties. In this regard see FIG. 1.

While the invention has been described with respect to certain preferred embodiments and exemplifications, it is not intended to limit the scope of the invention thereby, but solely by the claims appended hereto.

We claim:

1. A polymeric article comprising a polymer blend of two polymers different in surface tension by at least 5 dynes/centimeter and a diffusion barrier layer thereon, wherein the polymer having a lower surface energy is a Si containing, organosilicon polymer capable of undergoing partial oxidation when exposed to ozone and ultraviolet radiation, wherein the two polymers are substantially miscible, wherein the polymer having a higher surface energy is a polyepoxide, and wherein the diffusion barrier layer was formed by exposing the article to ozone and ultraviolet radiation to partially oxidize a portion of the lower surface energy polymer that diffused to the surface of the article.

2. The polymeric article of claim 1 wherein the low surface energy organosilicon polymer is chosen from the group consisting of silanes and siloxanes.

3. The polymeric article of claim 1 wherein the low surface energy organosilicon polymer is a siloxane.

4. The polymeric article of claim wherein the diffusion barrier is a layer of $SiO_x$ where x is between 1.6 and 2.0.

5. The polymeric article of claim 4 wherein the diffusion barrier is transparent at least from the 1140 nanometer infrared band through the visible band to the 185 nanometer ultraviolet band.

6. The polymeric article of claim 1 wherein the low surface energy organosilicon polymer is present as a dopant near the surface of the article.

7. The polymeric article of claim 1 wherein the low surface energy organosilicon polymer is dispersed throughout the article.

8. A polymeric article comprising a polymer blend of an organosilicon and organic polymer different in surface tension by at least 5 dynes/centimeter and a diffusion barrier layer thereon, wherein the two polymers are substantially miscible, wherein the organosilicon polymer is a lower surface energy polymer, relative to the organic polymer, capable of undergoing partial oxidation when exposed to ozone and ultraviolet radiation, wherein the organic polymer is a polyepoxide, and wherein the diffusion barrier layer is an $SiO_x$ diffusion barrier, where x is between 1.6 and 2.0, formed by exposing the article to ozone and ultraviolet radiation to partially oxidize a portion of the lower surface energy polymer that diffused to the surface of the article.

* * * * *

UNITED STATES PATENT AND TRADEMARK OFFICE
CERTIFICATE OF CORRECTION

PATENT NO. : 5,958,996
DATED : September 28, 1999
INVENTOR(S) : Egitto, et al.

It is certified that error appears in the above-identified patent and that said Letters Patent is hereby corrected as shown below:

On the title page, under item [56],

Attorney, Agent, or Firm--reads "Scheimser, Olsen & Watts; Ronald A. Kaschak"--should read "Schmeiser, Olsen & Watts; Lawrence R. Fraley".

Signed and Sealed this

Twenty-third Day of May, 2000

Attest:

Q. TODD DICKINSON

*Attesting Officer*

*Director of Patents and Trademarks*